(12) United States Patent
Chin et al.

(10) Patent No.: US 11,514,036 B2
(45) Date of Patent: Nov. 29, 2022

(54) METHOD AND SYSTEM FOR SELF-LEARNING NATURAL LANGUAGE PREDICTIVE SEARCHING

(71) Applicant: JPMorgan Chase Bank, N.A., New York, NY (US)

(72) Inventors: Ke-vin Chin, Hong Kong (HK); Chandrasekaran Balasubramanian, Hong Kong (HK); Krishnan P. Sankaran, Hong Kong (HK)

(73) Assignee: JPMORGAN CHASE BANK, N.A., New York, NY (US)

( * ) Notice: Subject to any disclaimer, the term of this patent is extended or adjusted under 35 U.S.C. 154(b) by 683 days.

(21) Appl. No.: 16/535,500

(22) Filed: Aug. 8, 2019

(65) Prior Publication Data

US 2020/0057764 A1 Feb. 20, 2020

Related U.S. Application Data

(60) Provisional application No. 62/718,728, filed on Aug. 14, 2018.

(51) Int. Cl.
| | |
|---|---|
| *G06F 16/00* | (2019.01) |
| *G06F 16/2452* | (2019.01) |
| *G06N 20/00* | (2019.01) |
| *G06F 16/248* | (2019.01) |
| *G06N 5/04* | (2006.01) |
| *G06F 40/30* | (2020.01) |
| *G06F 3/0481* | (2022.01) |
| *G06F 3/0484* | (2022.01) |

(52) U.S. Cl.
CPC ...... *G06F 16/24522* (2019.01); *G06F 16/248* (2019.01); *G06F 40/30* (2020.01); *G06N 5/042* (2013.01); *G06N 20/00* (2019.01); *G06F 3/0481* (2013.01); *G06F 3/0484* (2013.01)

(58) Field of Classification Search
CPC .......................... G06F 16/243; G06F 16/338
See application file for complete search history.

(56) References Cited

U.S. PATENT DOCUMENTS

| | | | |
|---|---|---|---|
| 9,875,284 B1 * | 1/2018 | Amacker | G06F 16/24578 |
| 2011/0238656 A1 * | 9/2011 | Hood | G06F 16/3322 707/E17.005 |
| 2012/0047134 A1 * | 2/2012 | Hansson | G06Q 30/0275 707/E17.084 |
| 2012/0265784 A1 * | 10/2012 | Hsu | G06F 16/3322 707/E17.014 |

(Continued)

*Primary Examiner* — Daniel Abebe
(74) *Attorney, Agent, or Firm* — Greenblum & Bernstein, P.L.C.

(57) ABSTRACT

Systems and methods are provided for self-learning natural language predictive searching including receiving a first input, the first input being related to the desired outcome; retrieving a first information related to the first input; determining a first output based on at least the first input and the first information; outputting the first output; receiving a second input based on the outputted first output in response to the first output being different from the desired outcome, the second input being related to the desired outcome; retrieving, by the processor, a second information related to the second input; determining a second output based on at least the second input, the second information, the first input and the first information; and outputting the second output.

20 Claims, 7 Drawing Sheets

(56) References Cited

U.S. PATENT DOCUMENTS

2016/0147889 A1* 5/2016 Lakshmanan ....... G06F 16/9038
  707/731
2017/0351962 A1* 12/2017 Appel .................... G06N 7/005

* cited by examiner

METHOD AND SYSTEM FOR SELF-LEARNING NATURAL LANGUAGE PREDICTIVE SEARCHING

PRIORITY TO RELATED APPLICATION

This application claims priority to U.S. Provisional Application No. 62/718,728, filed on Aug. 14, 2018, the contents of which being incorporated herein by reference in their entirety.

BACKGROUND

1. Field of the Disclosure

Example embodiments generally relate to methods and systems for self-learning natural language predictive searching. Specifically, example embodiments relate to methods and systems for providing a dynamic dashboard that is responsive to context specific inquiries and that substantially anticipates responses to user requests.

2. Background Information

Dashboards are typically designed to provide views of business performance along fixed or pre-determined visual representations such as graphs, tables, data figures, and the like. Specifically, data dashboards are typically information management tools that visually track, analyze and display relevant data such as key performance indicators (KPI), metrics and other key data points to monitor, e.g., the health of a business, department or specific process. Such dashboards are generally customizable to meet the unique needs of a department and/or company, and connect to the company's files, attachments, services and application program interfaces (API's) to display the relevant data in the form of tables, line charts, bar charts, gauges, and the like.

However, modern businesses typically prefer to operate in a more dynamic manner by anticipating a user's desired outcome, and typical dashboards are static and unable to anticipate the user's request to arrive at the desired outcome. Therefore, there is a need for dynamic dashboards that can take into account the context in which a user requests information in order to anticipate the request and provide the relevant information. As a user typically enters a request using natural language, a useful tool that takes into account the context of the user requesting the information and anticipate a response to the user's request is machine learning, and in particular machine learning applied to natural language processing.

Natural language processing is the processing and analyzing of natural language data such as, e.g., a sentence or question spoken or entered by a user in a human language, e.g., English. Natural language processing may include speech recognition, natural language understanding and natural language generation. For example, natural language processing includes tokenization, which is the segmentation of a natural language sentence into a plurality of portions, also referred to as tokens, each token being separately analyzed to determine its meaning. Natural language processing may also include feature engineering, which is the process of using domain knowledge of the data to create features usable by a machine learning algorithm, such features including, e.g., a dependency relationship that allows the identification of the closest matching search phrase. Natural language processing may also include entity recognition, also referred to as named-entity recognition, which is the process of extracting information from the natural language input, and using the extracted information to locate and classify entities mentioned in the natural language input, the entities being a person's name, an organization, a location, a medical code, a monetary value, a percentage, and the like. Typically, machine learning algorithms can be applied to natural language processing tasks to optimize natural language recognition.

Machine learning is the use of algorithms and statistical models to perform a specific task in an effective manner without using explicit instructions, and instead relying on detected patterns and inference. Machine learning is closely related to computational statistics, which focuses on making predictions using computers, and relies on mathematical optimization to preform predictive analysis by delivering relevant information to a requester. Machine learning is a subset of artificial intelligence, and machine learning algorithms build a mathematical model based on sample data on which the machine trains, in order to make predictions or decisions or to take actions without being explicitly instructed to do so. Machine learning algorithms are used in a wide variety of applications where it is typically infeasible to develop an algorithm of specific instructions for performing a task in each one of a number of possibilities due to a too large number of variables and possible outcomes. Within machine learning, reinforcement learning, also referred to as approximate dynamic programming, is an area of machine learning that typically involves an agent receiving an input and taking action in an environment so as to maximize some notion of cumulative reward. Specifically, reinforced learning is implemented via a feedback loop where the actions taken are calibrated so as to maximize a reward, the reward being, e.g., a desired output. In reinforced learning, a balance is struck between exploration of unchartered territory and exploitation of current knowledge. Therefore, utilizing machine learning to analyze natural language requests in order to build dynamic dashboards relying on the above framework may fulfill the above-discussed need for dynamic dashboards that can take into account the context in which a user requests information and to anticipate and provide the user's desired outcome may be advantageous.

SUMMARY

The present disclosure, through one or more of its various aspects, embodiments, and/or specific features or sub-components, provides, inter alia, various systems, servers, devices, methods, media, programs, and platforms for self-learning natural language predictive searching. The various aspects, embodiments, features, and/or sub-components provide a natural language search function that learns from user behavior and that is able to anticipate future questions and deliver optimal solutions before being asked. Accordingly, not only can a user's immediate request be answered, the user's ultimately desired outcome in formulating the immediate request can be anticipated and provided.

In example embodiments, the self-learning natural language predictive searching combines natural language searching with machine learning to not only anticipate and predict questions asked from a user, but to also actively guide the user along a discovery path to achieve the user's desired outcome such as, e.g., a sale conversion, a fund analysis, and the like. In example embodiments, a path or journey refers to the selections made by the user in response to options provided at a dynamic menu or dashboard as they navigate through, and interact with, the dynamic menu or dashboard. Thus, example embodiments of a method for self-learning natural language predictive searching include designing a dashboard that is contextually constructed, i.e., that depends on the context of the inquiry, which includes the search itself, the identity of the user, and the previous searching activity of the user as well as the previous searching activity of other users. In example embodiments, the previous activity of the user, or of other users, includes previous searches and previously performed tasks. As a result, the need for pre-defined dashboard layouts may be reduced or eliminated, and a dynamic self-improving dashboard that is responsive to the identity and ever changing context of users can be constructed.

In example embodiments, the self-improving nature of the dashboard becomes a force multiplier in the dashboard discovery journey as user behavior and preferences may be used in the design of the dashboard layout. Consequently, the dashboard creates a business specific, contextually aware natural language artificial intelligence algorithm that allows the dashboard platform to distinguish between similarities and differences in search text vocabulary, and associate the vocabulary with relevant terms such as, e.g., financial terms. For example, where the term "maturity" may generally correspond to a step in human psychological development, in the context of a financial institution, the term "maturity" is understood to represent the tenor of a financial instrument. As such, when a user of a financial application searches for "maturity," the dashboard will return results that are consistent with a meaning relative to a financial instrument because such is the context of the search. The context of the search can be defined as information relevant to the identity and activity of the user.

In example embodiments, contextually intelligent natural language searching not only allows directly relevant searches to be returned, but also allows second- and third-level associated results to be identified. For example, if a user searches for a fund, the dashboard platform may not only return information about the fund, such as the amount of assets under management or the identity of the members of the board of directors, but may also search deeper levels of association such as, e.g., campaigns related to the fund (second-level searching), typical purpose of such campaigns (third-level searching), and the like. Such second- and third-level searching may allow to uncover hidden relationships between the various search results unraveled via the user search request. As a result, in the example above, such context-driven searching allows the data exploration process to continue beyond merely providing information directly related to the fund.

In example embodiments, the self-learning natural language predictive searching allows for multi-dimensional searching in a single requesting phrase. For example, the requesting phrase may include a request for the identity (first dimension) of funds that have revenues (second dimension) greater than a threshold and that have a visitor count (third dimension) that is greater than another threshold, the fund being specialized in emerging countries (fourth dimension). Thus, the search extends across several dimensions. In example embodiments, a dashboard may also be personalized to specific users, where, e.g., charts that are most frequently used by a user can be designated as "favorites" for ease during future searches.

According to an aspect of the present disclosure, a method for self-learning natural language predictive searching to reach a desired outcome is provided. The method is implemented by a processor on a computing device. The method includes: receiving, by the processor, a first input related to the desired outcome; retrieving, by the processor, a first information related to the first input; determining, by the processor, a first output based on at least the first input and the first information; providing, by the processor, the first output; receiving, by the processor, a second input based on the provided first output in response to the first output being different from the desired outcome, the second input being related to the desired outcome; retrieving, by the processor, a second information related to the second input; determining, by the processor, a second output based on at least the second input, the second information, the first input, the first information and the first output; and providing, by the processor, the second output.

According to another aspect of the present disclosure, a computing device configured to implement an execution of a method for self-learning natural language predictive searching to reach a desired outcome is provided. The computing device includes a display screen, a processor, a memory, and a communication interface coupled to each of the processor, the memory, and the display screen. When the method is being executed, the processor is configured to: receive, via the communication interface, a first input, the first input being related to the desired outcome; retrieve a first information related to the first input; determine a first output based on at least the first input and the first information; provide the first output; receive a second input based on the provided first output in response to the first output being different from the desired outcome, the second input being related to the desired outcome; retrieve a second information related to the second input; determine a second output based on at least the second input, the second information, the first input, the first information and the first output; and provide the second output.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
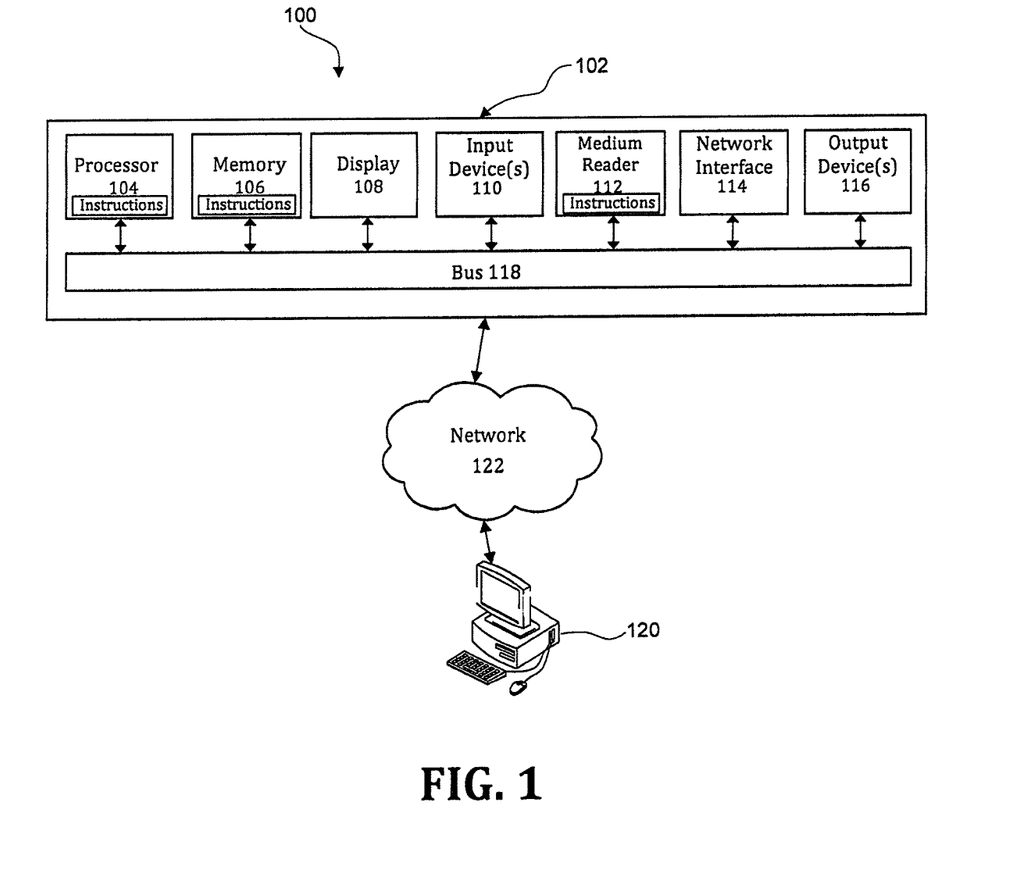
FIG. 1 illustrates a computer system for self-learning natural language predictive searching, according to an example embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
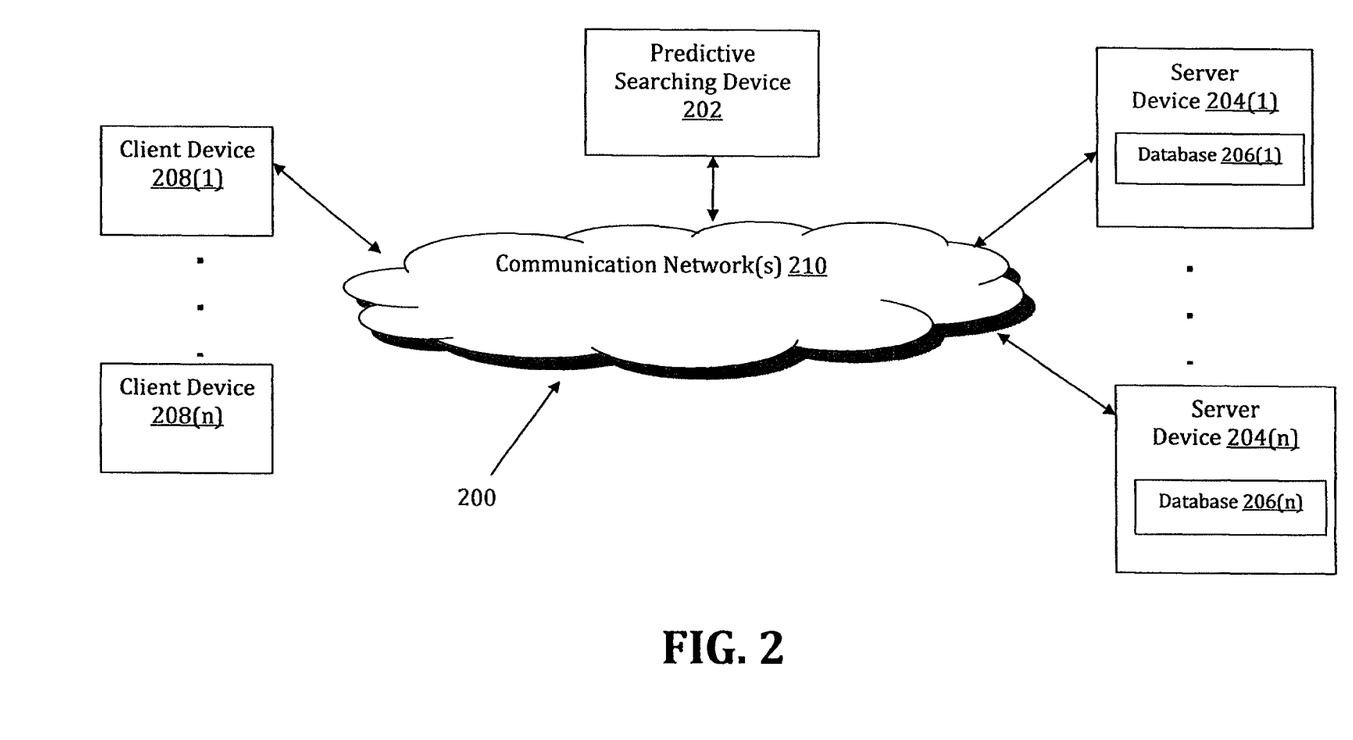
FIG. 2 illustrates a diagram of a network environment for self-learning natural language predictive searching, according to an example embodiment.

Referring to FIG. 2, a schematic of an exemplary network environment 200 for implementing self-learning natural language predictive searching is illustrated. In an exemplary embodiment, the self-learning natural language predictive searching framework is executable on any networked computer platform, such as, for example, a wireless mobile communication device, i.e., a smart phone.

The self-learning natural language Predictive Searching device 202, herein referred to as Predictive Searching device 202, may be the same or similar to the computer system 102 as described with respect to FIG. 1. The Predictive Searching device 202 may store one or more applications that can include executable instructions that, when executed by the Predictive Searching device 202, cause the Predictive Searching device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the Predictive Searching device 202 itself, may be located in virtual server(s) running in a cloud-based computing environment rather than being tied to one or more specific physical network computing devices. Also, the application(s) may be running in one or more virtual machines (VMs) executing on the Predictive Searching device 202. Additionally, in one or more embodiments of this technology, virtual machine(s) running on the Predictive Searching device 202 may be managed or supervised by a hypervisor.

In the network environment 200 of FIG. 2, the Predictive Searching device 202 is coupled to a plurality of server devices 204(1)-204(n) that hosts a plurality of databases 206(1)-206(n), and also to a plurality of client devices 208(1)-208(n) via communication network(s) 210. A communication interface of the Predictive Searching device 202, such as the network interface 114 of the computer system 102 of FIG. 1, operatively couples and communicates between the Predictive Searching device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the Predictive Searching device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and self-learning predictive searching devices that anticipate the response to a query based on available data and current context of the query.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The Predictive Searching device 202 may be a standalone device or integrated with one or more other devices or apparatuses, such as one or more of the server devices 204(1)-204(n), for example. In one particular example, the Predictive Searching device 202 may include or be hosted by one of the server devices 204(1)-204(n), and other arrangements are also possible. Moreover, one or more of the devices of the Predictive Searching device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the Predictive Searching device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store user data, context data, industry information, and data that relates to the self-learning natural language predictive searching framework.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of self-learning natural language predictive searching. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the Predictive Searching device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the Predictive Searching device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the Predictive Searching device 202, the server devices 204(1)-204(n), or the client devices 208(1)-208(n), for example, may be configured to operate as virtual instances on the same physical machine. In other words, one or more of the Predictive Searching device 202, the server devices 204(1)-204(n), or the client devices 208(1)-208(n) may operate on the same physical device rather than as separate devices communicating through communication network(s) 210. Additionally, there may be more or fewer Predictive Searching devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
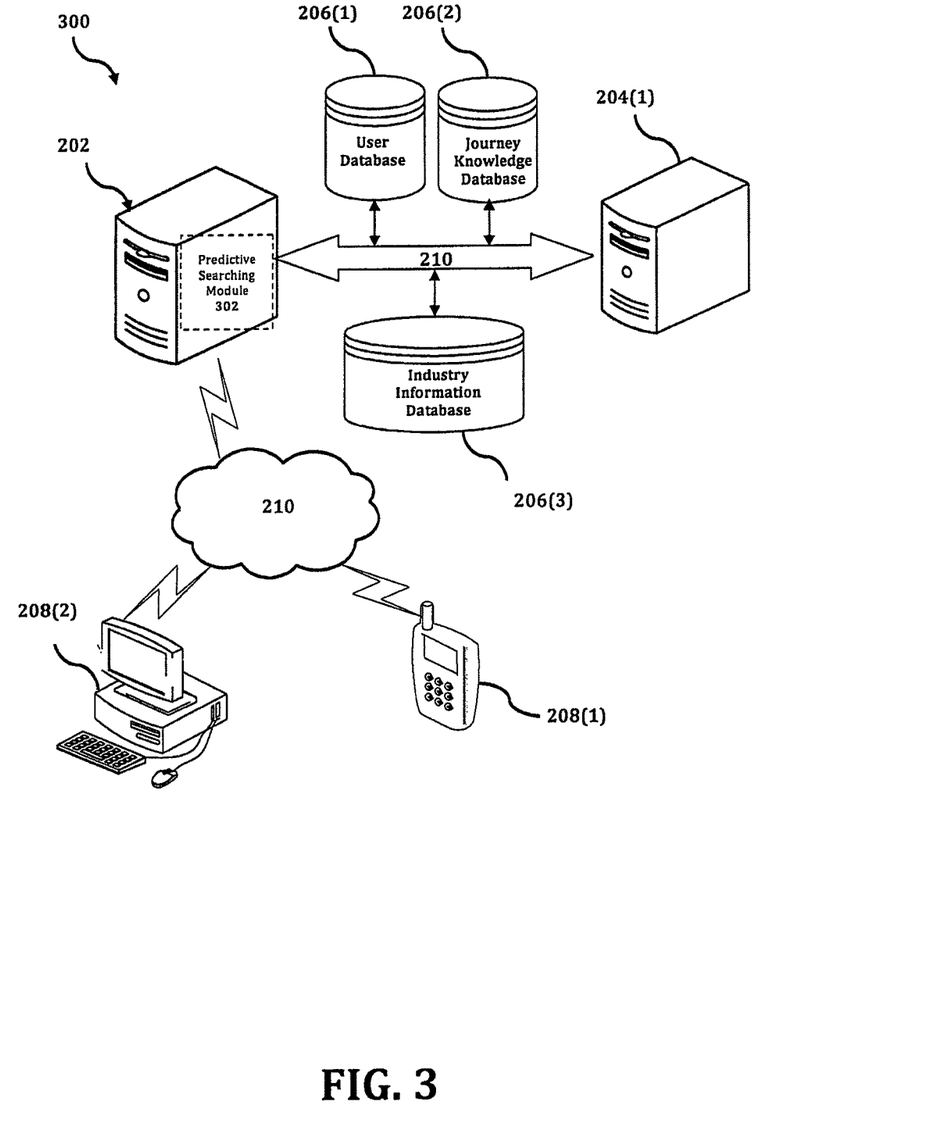
FIG. 3 shows a system for self-learning natural language predictive searching, according to an example embodiment.

The Predictive Searching device 202 is described and shown in FIG. 3 as including Predictive Searching module 302, although it may include other rules, policies, modules, databases, or applications, for example. As will be described below, the Predictive Searching module 302 is configured to predictively search the available data and context in response to a user query.

An exemplary process 300 for implementing a self-learning natural language predictive searching framework by utilizing the network environment of FIG. 2 is shown as being executed in FIG. 3. Specifically, a first client device 208(1) and a second client device 208(2) are illustrated as being in communication with Predictive Searching device 202. In this regard, the first client device 208(1) and the second client device 208(2) may be "clients" of the Predictive Searching device 202 and are described herein as such. Nevertheless, it is to be known and understood that the first client device 208(1) and/or the second client device 208(2) need not necessarily be "clients" of the Predictive Searching device 202, or any entity described in association therewith herein. Any additional or alternative relationship may exist between either or both of the first client device 208(1) and the second client device 208(2) and the Predictive Searching device 202, or no relationship may exist.

Further, Predictive Searching device 202 is illustrated as being able to access a user database 206(1), a journey knowledge database 206(2) and an Industry Information database 206(3). The Predictive Searching module 302 may be configured to access these databases for implementing a self-learning natural language predictive searching framework.

The first client device 208(1) may be, for example, a smart tablet. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the Predictive Searching device 202 via broadband or cellular communication. Of course, these embodiments are merely exemplary and are not limiting or exhaustive.

Upon being started, the Predictive Searching module 302 executes a process for self-learning natural language predictive searching. An exemplary process for implementing a self-learning natural language predictive searching is generally indicated at flowchart 400 in FIG. 4.

Figure 4:
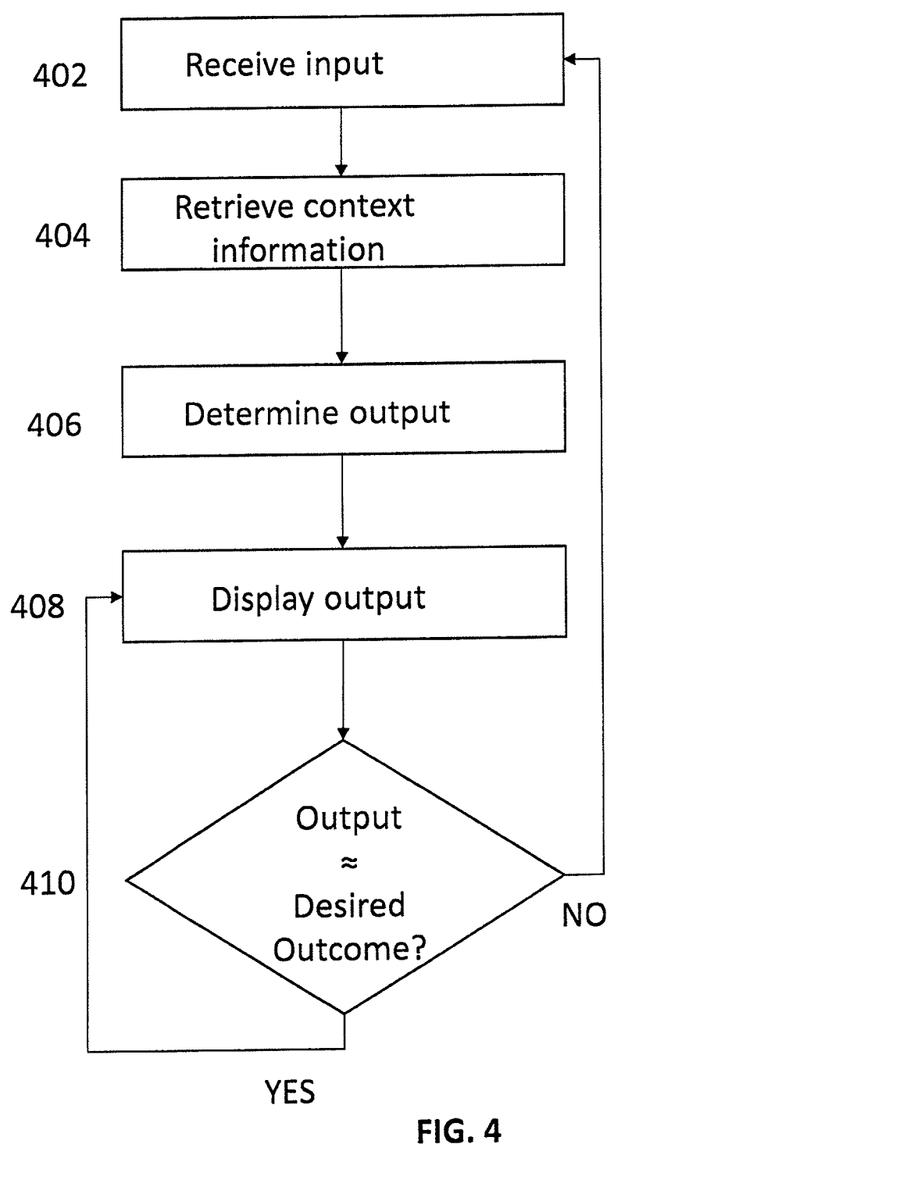
FIG. 4 is a flowchart of a method of self-learning natural language predictive searching, according to an example embodiment.

In the process 400 of FIG. 4, at step S402, with reference to FIG. 3, the Predictive Searching module 302 receives an input at an input interface thereof. In example embodiments, the input may be a question asked by the user, a menu selection from a dashboard of menus, an identifier of the user such as, e.g., a name or employee ID number, search parameters used by the user, and search parameters used previously by other users. In example embodiments, the input is the first step for a user to reach a desired outcome. In example embodiments, the desired outcome is the intended final result of the user in providing the input and may not be the direct response to the input. For example, the desired outcome may be the result of one or more searching steps removed from the direct response to the first input.

At step S404, the Predictive Searching module 302 retrieves a set of information, or data, related to the input and which constitute information defining a context of the search. In example embodiments, the set of information and information defining the context of the user submission may include the past history of the user entering the input such as, e.g., the type of queries previously submitted to the Predictive Searching module 302 by the user, the domains to which the queries were related, the types of information requested, the types of final outcomes resulting from the user's various queries, and the like. In example embodiments, the set of information and information defining the context also include the past history of other users that belong to the same domain as the user, the types of queries submitted by the other users, the types of final outcomes resulting from the other user's queries, and the like. For example, if the user is a financial analyst, then other users for which queries are included as part of the retrieved information may also be financial analysts. If the other users belong to a domain that is irrelevant to the user's domain, then their query history and outcomes may be irrelevant to the user's query and may be omitted by the Predictive Searching module 302 in retrieving information defining the context of the user search.

At step S406, in example embodiments, the Predictive Searching module 302 determines an output in response to the user's input based on the context of the search. For example, if the user's input is a query about the profits and loss sheet of a particular company for a given year, the output at step S406 may be the profits and losses for that company, but may also include profits and losses for other years, profits and losses of competitors, projections of profits and losses for the company or the competitors, and the like, any one of these outputs possibly being the user's desired final outcome in entering the initial search input about the profits and loss sheet of the company. In example embodiments, the Predictive Searching module 302 determines the output by utilizing a combination of natural processing language and machine learning. In example embodiments, the Predictive Searching module 302 first processes the user input using natural language processing. In example embodiments, the Predictive Searching Module 302 may subject the request to, e.g., a tokenization process, a feature engineering process, and an entity recognition process. For example, tokenization is the segmentation of a natural language sentence into a plurality of portions, also referred to as tokens, each token being separately analyzed to determine its meaning. Feature engineering is the process of using domain knowledge of the data to create features usable by a machine learning algorithm. Specifically, feature engineering may include tagging the question entered by the user, entity recognition based on the tagged question, and identification of a closest matching search phrase. Entity recognition is the process of extracting information from the natural language input, and using the extracted information to locate and classify entities mentioned in the natural language input.

In example embodiments, the Predictive Searching module 302 may utilize machine language processing on the natural language input to build a mathematical model based on the user input data, and may train on the user input data by using the context of the user search as well as other users that have previously performed similar searches, in order to make rapid and efficient predictions as to the desired outcome of the user search. For example, in example embodiments, the Predictive Searching module 302 utilizes a "reinforced leaning" algorithm to predict the desired outcome when the user inputs the initial request, which is also referred to as approximate dynamic programming, and which is an area of machine learning that typically involves receiving an input and taking action in an environment so as to maximize some notion of cumulative reward. Specifically, reinforced learning is implemented via a feedback loop where the actions taken are calibrated so as to maximize a reward, the reward being, e.g., the desired output of the user search.

At step S408, in example embodiments, the Predictive Searching module 302 displays the output to the user. In example embodiments, the output may be in the form of a dashboard to provide the user with a visual representation of not only the direct response to the user's question or menu selection, but also other information closely relevant to the user's input. Accordingly, the dashboard may include a plurality of selectable menus, each menu representing the direct response to the user's question as well as other possible outcomes that may approximate the user's desired outcome.

At step S410, in example embodiments, the Predictive Searching module 302, e.g., via further input from the user, determines whether the output displayed as a dashboard at step S408 is the desired outcome, or sufficiently close to the desired outcome sought by the user when submitting the input at step S402. In example embodiments, the output is sufficiently close to the desired outcome when the user is satisfied by that the output adequately responds to the input. For example, if the input is a question, then the output is sufficiently close to the desired outcome when the user is satisfied that the output adequately answers the question. In example embodiments, a second output is closer to the desired outcome than a first output when the number of inputs entered by the user to reach the desired outcome if the search started based on the second output is lower than the number of inputs entered by the user to reach the desired outcome if the search was based on the first output. For example, the second output is closer to the desired outcome than the first output when the number of iterations for the user is smaller starting from the second output than starting from the first output. If the output is sufficiently close to the desired outcome, then the Predictive Searching module 302 returns to step S408 and keeps the desired outcome on display at step S408.

At step S410, in example embodiments, if the output is not sufficiently close, or different, or substantially different, or sufficiently removed from the desired outcome, then the Predictive Searching module 302 continues to step S402 and receives another input from the user. In example embodiments, the other input submitted by the user is based on the output that was displayed at step S408, and is thus an informed input submitted by the user.

According to various example embodiments, the steps S402 to S410 may be repeated a number of times, as needed based on the desired outcome, until the desired outcome is determined and provided to the user, e.g., as a display on a dashboard. In example embodiments, every time the steps S402 to S410 are performed, the Predictive Searching module 302 comes ever closer to determining the desired outcome because the Predictive Searching module 302, when retrieving information at step S404, retrieves information that includes the output determined in the immediately preceding iteration of the steps S402 to S410. Accordingly, as the Predictive Searching module 302 utilizes a combination of machine learning and natural language processing to parse and process the various inputs provided by the user, the determined output after each iteration of the steps S402 to S410 is ever closer to the desired outcome until becoming, or merging with, the desired outcome. As a result, the dashboard displayed during each iteration of the steps S402 to S410 is evolving, and is a dynamic dashboard having iterations tending towards the desired outcome.

In example embodiments, a second output is closer to the desired outcome than a first output when the number of iterations of the steps S402 to S410 when starting from the second output is lower than the number of iterations of the steps S402 to S410 when starting from the first output.

In example embodiments, as the Predictive Searching module 302 trains on the user inputs and on the context of the user inputs as well as the context of other previous users, the desired ultimate outcome can be predicted to the user even when the user is in early searching stages.

Figure 5:
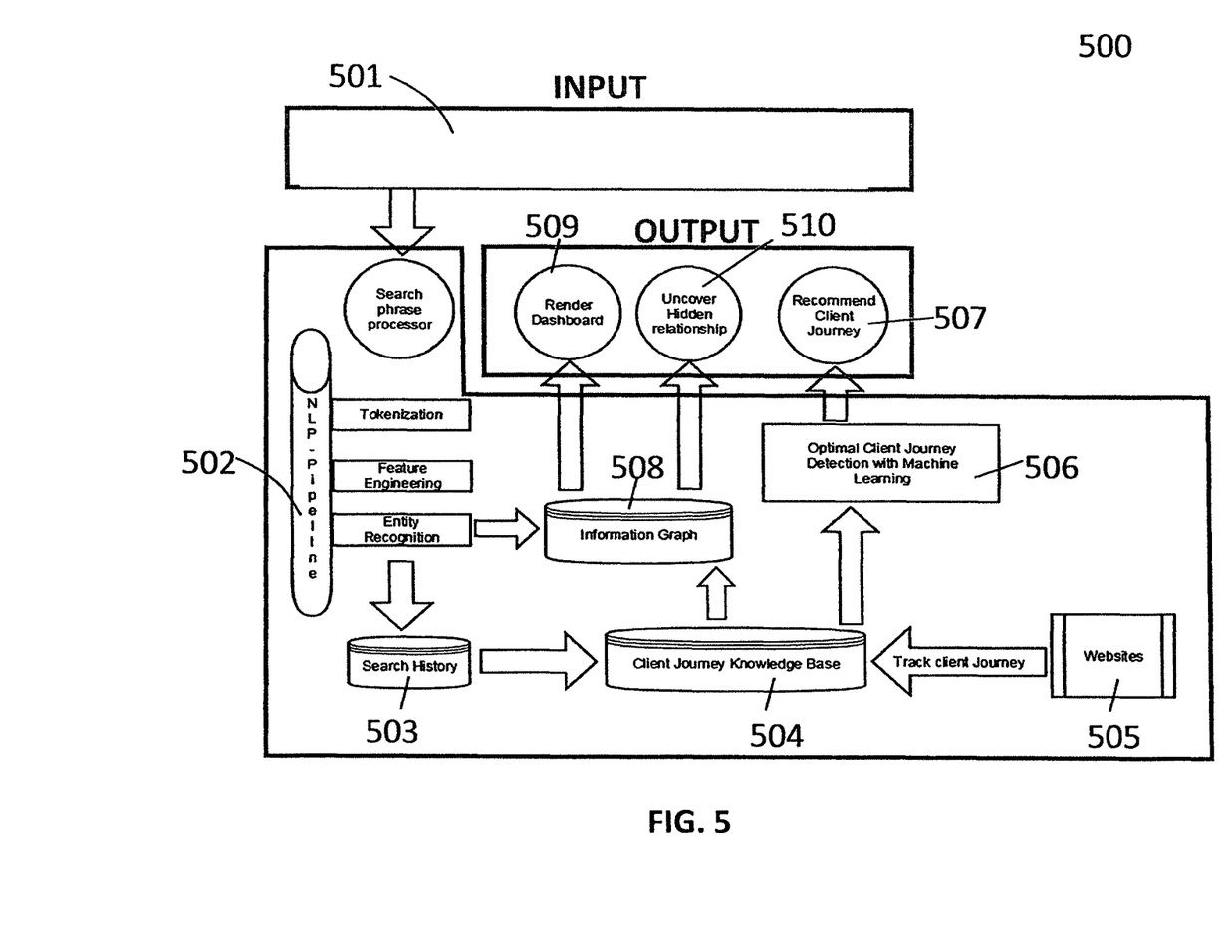
FIG. 5 illustrates a diagram of self-learning natural language predictive searching, according to an example embodiment.

FIG. 5 illustrates a diagram of self-learning natural language predictive searching 500, according to an example embodiment. In FIG. 5, an input 501 is received, for example, the input is a request from a user. With reference to FIG. 3, the input 501 is received at the Predictive Searching Module 302. When the request is received, the Predictive Searching Module 302 performs natural language processing (NLP) of the request via NLP processing 502. In example embodiments, the Predictive Searching Module 302 may subject the request to, e.g., a tokenization process, a feature engineering process, and an entity recognition process. For example, tokenization is the segmentation of a natural language sentence into tokens. Feature engineering may include tagging the question entered by the user, entity recognition based on the tagged question, and identification of a closest matching search phrase. Entity recognition is the process of extracting information from the natural language input, and using the extracted information to locate and classify entities mentioned in the natural language input.

In example embodiments, the Predictive Searching Module 302, based on the information extracted from the NLP processing 502, provides the output from the NLP processing 502 to the Information Graph 508, which graphically processes the output of the NLP processing 502 to generate a dashboard 509.

In example embodiments, the Predictive Searching Module 302, also based on the information extracted from the NLP processing 502, searches and extracts data from a search history database 503, the search history database 503 including data relative to previous searches received from users at input 501, and compares the extracted data form the search history database 503 with the user input 501 in order to determine whether similar queries have been entered either by the user, or alternatively by other users, and to retrieve the desired outcomes of such searches. In example embodiments, the Predictive Searching Module 302 transmits the data retrieved from the search history database 503 to the Journey Knowledge Base 504, which is a data repository of user path knowledge including information relative to previous user journeys including previous journeys and the current journey of the current user, and including journeys of other relevant users. For example, the other relevant users are from the same domain or industry as the user. For example, the Journey Knowledge Base 504 includes the discovery path, or information acquisition progression, of previous relevant users, or of the same user at an earlier time. Accordingly, the Predictive Searching Module 302 can, based on the user's initial request, anticipate the user's final requested outcome based on previous users' reached final outcomes who entered the same or similar initial requests as the current user. A more detailed description of operation of the Predictive Searching Module 302 at the Journey Knowledge Base 504 is provided below with respect to FIG. 6.

In example embodiments, the Journey Knowledge Base 504 gathers information from the user's journey and other users' journeys through various websites and information sources 505. As such, when the user enters an initial request as input 501, the Predictive Searching Module 302 can access information relative to any websites that the user, or other users submitting the same or similar input, have visited. Coupled with the information obtained from the Search History 503 and the NLP 502, the Predictive Searching Module 302 can predict possible desired outcomes, and provide those predicted possible desired outcomes to the user. As such, the Predictive Searching Module 302 detects an optimal client journey consistent with the user's specific purpose, and avoids providing to the user information that is not relevant to the user's predicted desired outcome. As a result, the Predictive Searching Module 302 can recommend a client journey 507 to the user, the client journey including the predicted user's desired outcome, or a path to that predicted desired outcome.

In example embodiments, the Predictive Searching Module 302 also transmits information from the client journey base 504 to the information graph 508, and to provide a recommend path at the Optimal Client Journey module 506, which then generates an output recommending a Client Journey 507. In example embodiments, the Predictive Searching Module 302 uses the data in the information graph 508 to render the dashboard 509 to the user, the dashboard being dynamic, because it corresponds to the user's current request or input, provides a path to the predicted user's requested outcome, and can change based on the user's inputs. In example embodiments, the dashboard 509, which was rendered in response to the information provided from the NLP processing 502 and the Information Graph 508, may be altered based on the new information provided form the client journey information 504. As such, the dashboard 509 is a dynamic dashboard that is adjusted based on the latest most relevant searching output available.

In example embodiments, the Predictive Searching Module 302 uncovers hidden relationships at the hidden relationship module 510 between fields or items that were not part of the user's initial request, but that, based on the information gathered via the NPL processing 502, the search history 503, the client journey knowledge base 504, the websites 505, and the like, appear to be germane, or at least indirectly relevant, to the user's initial request and to the predicted user's desired outcome. For example, if the user is searching for an investment fund specializing in foreign currency sold in Switzerland using a website 505, the Predictive Searching Module 302 can retrieve the search information from the website 505 and outputs events or campaigns that are upcoming in Geneva related to currency exchange. In example embodiments, the user is given the option to uncover the hidden relationships accessible via the hidden relationship module 510 by clicking on a corresponding selectable menu item on the dynamic dashboard. Accordingly, the user may be directed to alternative discovery paths based on second- and third-level hidden relationships that were not readily visible at the beginning of the user search. In addition, the alternative discovery paths may more efficiently guide the user to the desired outcome of the search.

Figure 6:
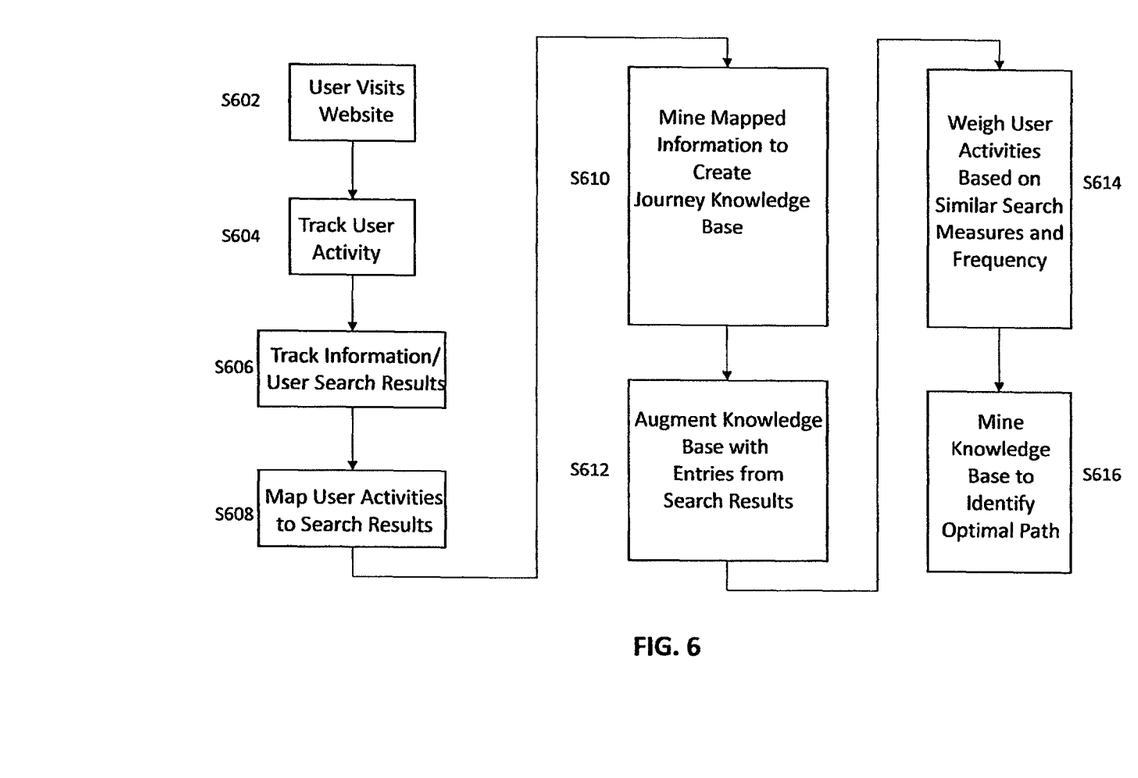
FIG. 6 is a flow chart illustrating a process as part of self-learning natural language predictive searching, according to an example embodiment.

FIG. 6 is a flow chart illustrating a process as part of self-learning natural language predictive searching, according to an example embodiment. With respect to FIG. 6, in step S602, a user visits a website that has a search function. At step S604, referring back to FIG. 3, the Predictive Searching Module 302 tracks the user's activities at the visited website via one or more tracking mechanisms such as, e.g., tracking cookies, and gathers user activity information. At step S606, in example embodiments, the Predictive Searching Module 302 overlays the user activity information with results obtained from a search conducted by the user while visiting the website. At step S608, in example embodiments, the Predictive Searching Module 302 maps each user path to the results obtained from the user's search. At step S610, in example embodiments, the Predictive Searching Module 302 mines the user paths mapped to the user's search results to create a knowledge base, the knowledge base including one or more sets of actions and/or assets in the visited website, as well as notes relative to the user and relationships of various assets relevant to the user search. In embodiments, the Predictive Searching Module uses the knowledge base to create paths between different assets based on the user's activity.

At step S612, in example embodiments, the Predictive Searching Module 302 augments the knowledge base with actual entries extracted from results obtained from the user's current search. Accordingly, the Predictive Searching Module 302 associates user paths to the search input entered by the user, any entities or assets identified via natural language processing, and the actual path taken by the user. At step S614, in example embodiments, the Predictive Searching Module 302 weighs the user paths based on measures that comprise similar searches and the frequency of paths taken between entities. As the Predictive Searching Module 302 repeats this process as various users perform searches, the result is an increasing amount of search results mapped to various user activities, and the Predictive Searching Module 302 continuously augments the knowledge base, such as the Journey Knowledge Base 504 illustrated in FIG. 5, with new entities and relationships. At step S616, in example embodiments, the Predictive Searching Module 302 mines the knowledge base to predict an optimized path to the user's desired outcome. In example embodiments, machine learning is used to achieve the prediction, and the above-described process and may reveal relationships that were hidden from the user when initially entering the search request.

As an illustration of the above process, in example embodiments, if a previous user has selected from a dashboard a first menu option, a second menu option, a third menu option, and a fourth menu option to arrive at a desired outcome, the Predictive Searching Module 302 may recognize the pattern and store the recognized pattern as a specific search path. In example embodiments, the Predictive Searching Module 302 associates the search path with the displayed output, or with characteristics of the user. For example, a user searches for a financial fund by entering the fund name into the search field. As a result, basic fund information is displayed to the user with a link that is user selectable. The user may then select the link to cause the display of a details page that displays additional information about the financial fund, for example, without limitation, fund performance, comparison charts, and disclaimers. In this example, the user may be most interested in fund performance and may search for fund performance history information. As a result of what the user learns from the fund performance history information, the user may decide to purchase shares of the fund. The user may then navigate to a user interface that enables the user to purchase the shares. In example embodiments, the Predictive Searching Module 302 records the steps described above as a user search path. In example embodiments, the Predictive Searching Module 302 optimizes the user search path so that when a user searches for a fund by entering the fund name, the above-discussed fund information is displayed. Additionally, the Predictive Searching Module 302 may display to the user a selectable link to performance history, and may automatically provide a link that enables the user to purchase shares of the fund when the user selects the link to display the fund's performance history. Accordingly, the Predictive Searching Module 302 provides the user with an interaction that requires fewer selections while providing the same information and capabilities without the numerous steps that would have been otherwise required.

Figure 7:
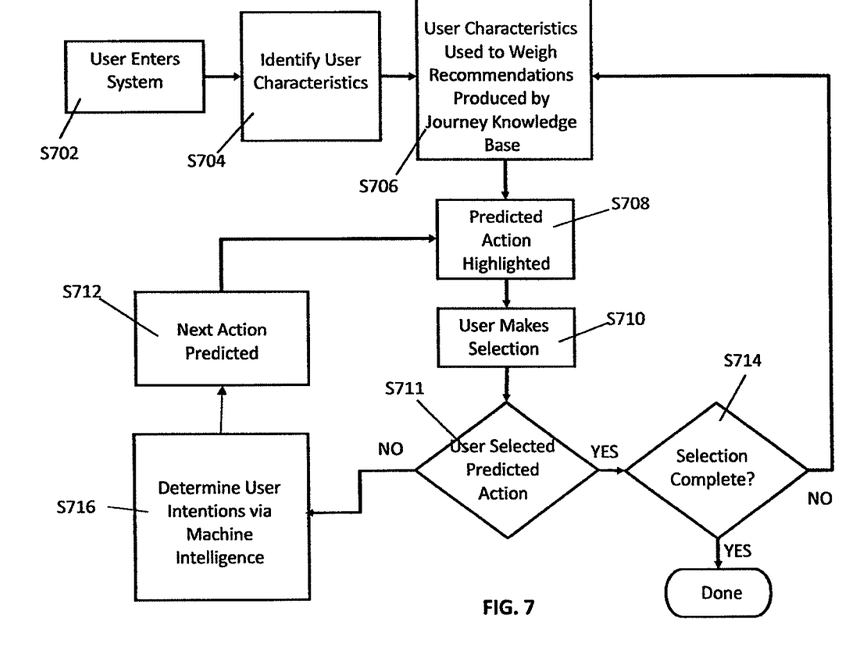
FIG. 7 is a flow chart illustrating a process as part of self-learning natural language predictive searching, according to an example embodiment.

FIG. 7 is a flow chart illustrating a process as part of self-learning natural language predictive searching, according to an example embodiment. In example embodiments, a user accesses the system at step S702. In example embodiments, referring back to FIG. 3, the Predictive Searching Module 302 identifies the user and the user's characteristics at step S704. At step S706, the Predictive Searching Module 302 uses the user characteristics to weigh or otherwise influence the recommendations provided from the journey knowledge base 504 with reference to FIG. 5. In example embodiments, the Predictive Searching Module 302 highlights or otherwise designates a menu item or next action to the user at step S708. In example embodiments, the user selects an action or menu items which is received by the Predictive Searching Module 302 at step S710. If the Predictive Searching Module 302 determines at step S711 that the selection at step S710 is the one highlighted at step S708, the Predictive Searching Module 302 generates a next recommendation at step S712 and repeats the steps of highlighting a recommended selection at step S708 and receiving the user's selection at step S710 until the user is finished entering menu items at step S714.

According to example embodiments, if the selection received by the Predictive Searching Module 302 at step S710 is not the selection recommended at step S708, the Predictive Searching Module 302 revises the criteria weighing and decisioning generated from the journey knowledge base 504 to make an updated selection recommendation to the user at step S716. In example embodiments, the Predictive Searching Module 302 utilizes machine learning to compare recommendations made to the selections entered by various users. The Predictive Searching Module 302 may also utilize machine learning to adjust the factors used to predict the recommendation at step S708 in order to improve the suggested menu path for future recommendations. In example embodiments, another recommendation is received by the Predictive Searching Module 302 from the user at step S712, and the process of indicating the recommended selection at step S708 and receiving the user's selection at step S710 may be repeated until the user is finished entering menu items at step S714, in which case the process ends.

Accordingly, example embodiments build on the current natural language search methodologies by combining machine learning to not only anticipate and predict questions or requests submitted by a user, but also to actively guide the user along a discovery path that achieves a desired outcome in an efficient and time-saving manner.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular processes, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory (RAM) or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in example embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of the entirety of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing self-learning natural language predictive searching to reach a desired outcome, the method being implemented by a processor on a computing device, the method comprising:
   receiving, by the processor, a first input related to the desired outcome, the first input corresponding to a natural language input;
   segmenting, by the processor, a natural language sentence from the first input into a plurality of tokens;
   generating, by the processor, at least one feature that is usable by a machine learning algorithm based on domain knowledge of the first input;
   locating, by the processor, at least one entity mentioned in the natural language input based on extracted data from the first input;
   retrieving, by the processor, a first information related to the first input;
   determining, by the processor, a first output based on the first input, the plurality of tokens, the at least one feature, the at least one entity, and the first information;
   outputting, by the processor, the first output;
   receiving, by the processor, a second input based on the outputted first output in response to the first output being different from the desired outcome, the second input being related to the desired outcome;
   retrieving, by the processor, a second information related to the second input;
   determining, by the processor, a second output based on at least the second input, the second information, the first input, the first information and the first output; and
   outputting, by the processor, the second output.

2. The method of claim 1, wherein at least one of the retrieving the first information and the retrieving the second information comprises:
   accessing a past history of a user entering the first input and the second input, the past history including past requests from the user and outcomes of the past requests, the first input and the second input being related to a specific domain;
   accessing a past history of other users related to the specific domain, the past history including other past requests from the other users and other outcomes of the other past requests.

3. The method of claim 2, wherein at least one of the determining the first output and the determining the second output comprises utilizing a combination of natural processing language and machine learning.

4. The method of claim 2, wherein at least one of the determining the first output and the determining the second output comprises:
   processing the first input and the first information via machine learning;
   determining at least one discovery path to the desired outcome based on the processed first input and first information; and
   modifying the determined at least one discovery path based on the second input, the second information and the first output.

5. The method of claim 4, wherein the utilizing the combination of natural processing language and machine learning comprises utilizing machine learning based on reinforced learning.

6. The method of claim 1, wherein the first information and the second information comprise data defining a context of the first and second input, respectively.

7. The method of claim 1, wherein at least one of the first input and the second input comprises at least one of a question asked by a user, a menu selection, an identifier of the user, search parameters of the user, and search parameters of other users.

8. The method of claim 1, wherein at least one of the outputting the first output and the outputting the second output comprises displaying a first dashboard illustrating the first output and displaying a second dashboard illustrating the second output, the second dashboard being a modified version of the first dashboard.

9. The method of claim 8, wherein second information displayed on the second dashboard is closer to the desired outcome than first information displayed on the first dashboard.

10. The method of claim 9, wherein:
   an iteration comprises receiving an input, retrieving information related to the input and outputting an output; and
   the second information is closer to the desired outcome than the first information when a number of iterations to reach the desired outcome starting from the second output is lower than the number of iterations to reach the desired outcome starting from the first output.

11. A computing device configured to implement an execution of a method for self-learning natural language predictive searching to reach a desired outcome, the computing device comprising:
 a display screen;
 a processor;
 a memory; and
 a communication interface coupled to each of the processor, the memory, and the display screen,
 wherein, when the method is being executed, the processor is configured to:
  receive, via the communication interface, a first input related to the desired outcome, the first input corresponding to a natural language input;
  segment a natural language sentence from the first input into a plurality of tokens;
  generate at least one feature that is usable by a machine learning algorithm based on domain knowledge of the first input;
  locate at least one entity mentioned in the natural language input based on extracted data from the first input;
  retrieve a first information related to the first input;
  determine a first output based on at least the first input, the plurality of tokens, the at least one feature, the at least one entity, and the first information;
  output the first output;
  receive a second input based on the outputted first output in response to the first output being different from the desired outcome, the second input being related to the desired outcome;
  retrieve a second information related to the second input;
  determine a second output based on at least the second input, the second information, the first input, the first information and the first output; and
  output the second output.

12. The computing device of claim 11, wherein the processor, in order to at least one of retrieve the first information and retrieve the second information, is further configured to:
 access a past history of a user entering the first input and the second input, the past history including past requests from the user and outcomes of the past requests, the first input and the second input being related to a specific domain;
 access a past history of other users related to the specific domain, the past history including other past requests from the other users and other outcomes of the other past requests.

13. The computing device of claim 12, wherein, in order to determine at least one of the first output and the second output, the processor is further configured to utilize a combination of natural processing language and machine learning.

14. The computing device of claim 12, wherein, in order to determine the at least one of the first output and the second output, the processor is further configured to:
 process the first input and the first information via machine learning;
 determine at least one discovery path to the desired outcome based on the processed first input and first information; and
 modify the determined at least one discovery path based on the second input, the second information and the first output.

15. The computing device of claim 14, wherein the processor is further configured to utilize machine learning based on reinforced learning.

16. The computing device of claim 11, wherein the first and second information comprise data defining a context of the first and second input, respectively.

17. The computing device of claim 11, wherein at least one of the first input and the second input comprises at least one of a question asked by a user, a menu selection, an identifier of the user, search parameters of the user, and search parameters of other users.

18. The computing device of claim 11, wherein, in order to output at least one of the first output and the second output, the processor is further configured to display a first dashboard illustrating the first output and display a second dashboard illustrating the second output, the second dashboard being a modified version of the first dashboard.

19. The computing device of claim 18, wherein second information displayed on the second dashboard is closer to the desired outcome than first information displayed on the first dashboard.

20. The computing device of claim 19, wherein:
 an iteration comprises receiving an input, retrieving information related to the input and outputting an output; and
 the second information is closer to the desired outcome than the first information when a number of iterations to reach the desired outcome starting from the second output is lower than the number of iterations to reach the desired outcome starting from the first output.

* * * * *